United States Patent
Sekine et al.

(10) Patent No.: US 12,013,011 B2
(45) Date of Patent: Jun. 18, 2024

(54) CYLINDER DEVICE

(71) Applicant: HITACHI ASTEMO, LTD., Ibaraki (JP)

(72) Inventors: Chigaya Sekine, Ibaraki (JP); Satsuki Yamamoto, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 357 days.

(21) Appl. No.: 17/621,787

(22) PCT Filed: Jun. 5, 2020

(86) PCT No.: PCT/JP2020/022342
§ 371 (c)(1),
(2) Date: Dec. 22, 2021

(87) PCT Pub. No.: WO2020/261942
PCT Pub. Date: Dec. 30, 2020

(65) Prior Publication Data
US 2022/0260130 A1    Aug. 18, 2022

(30) Foreign Application Priority Data
Jun. 26, 2019 (JP) ................. 2019-118457

(51) Int. Cl.
*F16F 9/58* (2006.01)
*B60G 13/08* (2006.01)
*F16F 1/12* (2006.01)

(52) U.S. Cl.
CPC ............. *F16F 9/58* (2013.01); *B60G 13/08* (2013.01); *F16F 1/12* (2013.01)

(58) Field of Classification Search
CPC ...... F16F 9/58; F16F 9/585; F16F 1/12; B60G 13/08
See application file for complete search history.

(56) References Cited

U.S. PATENT DOCUMENTS 4,345,748 A * 8/1982 Wossner ................. F16F 9/483
267/226
5,501,438 A * 3/1996 Handke .................... F16F 9/49
267/221

(Continued)

FOREIGN PATENT DOCUMENTS

JP    H05-022886 U    3/1993
JP    H05-086051 U    11/1993

(Continued)

OTHER PUBLICATIONS

International Search Report dated Jul. 21, 2020 for WO 2020/261942 A1 (5 pages).

*Primary Examiner* — Thomas W Irvin
(74) *Attorney, Agent, or Firm* — Venjuris, P.C.

(57) ABSTRACT

A rebound control mechanism includes: a spring member located between a piston and a rod guide and provided on an outer periphery of a piston rod; and a spring receiver provided on the side of the rod guide and to which an upper portion of the spring member is attached. The spring receiver includes a tubular portion fixed between a cylinder and the rod guide, and a second flange portion provided at a lower end of the tubular portion and extending inward in a radial direction, and is configured to indirectly fix the upper end side of the spring member by the second flange portion.

7 Claims, 10 Drawing Sheets

(56) References Cited

U.S. PATENT DOCUMENTS

| | | | | |
|---|---|---|---|---|
| 7,032,727 | B2* | 4/2006 | Vanspauwen | F16F 9/585 |
| | | | | 267/221 |
| 8,127,901 | B1* | 3/2012 | Lu | F16F 9/585 |
| | | | | 188/282.5 |
| 8,418,820 | B2 | 4/2013 | Kim | |
| 9,221,315 | B2* | 12/2015 | Shii | B60G 15/061 |
| 9,651,110 | B2* | 5/2017 | Takeno | F16F 9/49 |
| 9,909,638 | B2* | 3/2018 | Chyla | F16F 9/36 |
| 10,107,351 | B2* | 10/2018 | Chyla | B60G 17/08 |
| 10,557,513 | B2* | 2/2020 | Pecar | F16F 9/363 |
| 11,773,941 | B2* | 10/2023 | Meinert | F16F 9/3484 |
| | | | | 267/140.13 |
| 2008/0088070 | A1* | 4/2008 | Mori | F16F 9/585 |
| | | | | 267/140.12 |
| 2009/0107781 | A1* | 4/2009 | Fritz | F16F 9/585 |
| | | | | 188/280 |
| 2011/0101585 | A1* | 5/2011 | Kamae | F16F 9/3242 |
| | | | | 267/226 |
| 2017/0159743 | A1* | 6/2017 | Chyla | B60G 17/08 |
| 2018/0163813 | A1* | 6/2018 | Chyla | F16F 9/49 |
| 2021/0115998 | A1* | 4/2021 | Meinert | F16F 9/585 |
| 2021/0246961 | A1* | 8/2021 | Inuzuka | F16F 9/585 |
| 2023/0039371 | A1* | 2/2023 | Kim | B60G 7/04 |

FOREIGN PATENT DOCUMENTS

| | | |
|---|---|---|
| JP | 2009-063081 A | 3/2009 |
| JP | 2011-094749 A | 5/2011 |

\* cited by examiner

CYLINDER DEVICE

CROSS REFERENCE TO RELATED APPLICATIONS

This application is a national phase of PCT application No. PCT/JP2020/022342, filed on 5 Jun. 2020, which claims priority from Japanese patent application No. 2019-118457, filed on 26 Jun. 2019, all of which are incorporated herein by reference.

TECHNICAL FIELD

The present disclosure relates to a cylinder device mounted on a vehicle such as a four-wheeled vehicle and properly used to buffer the vibration of the vehicle.

BACKGROUND

Generally, a vehicle such as a four-wheeled vehicle is provided with a cylinder device serving as a hydraulic shock absorber between each wheel (axle side) and the vehicle body. In the cylinder device, the vibration of the vehicle is buffered by a piston rod extending and contracting with respect to the cylinder. The cylinder device is provided with a rebound control mechanism so that the full extension limit of the piston rod is not exceeded when the piston rod is largely extended. The rebound control mechanism includes a spring member provided on the outer periphery of the piston rod (Patent Document 1).

PRIOR ART DOCUMENT

Patent Document

Patent Document 1: U.S. Pat. No. 8,418,820

SUMMARY OF THE INVENTION

Problem to be Solved

According to Patent Document 1, a spring member constituting a rebound control mechanism is formed as a coil spring surrounding a piston rod, and is freely arranged in a cylinder. For this reason, there is a problem that the spring member may collide with a rod guide that guides the piston rod to generate a sound when the piston rod is extended or contracted.

An object of an embodiment of the present disclosure is to provide a cylinder device capable of suppressing the sound generated by a spring member during an extension/contraction operation of a piston rod and improving quietness.

Means to Solve the Problem

According to the embodiment of the present disclosure, a cylinder device includes: a cylinder in which a working fluid is filled and sealed; a piston slidably fitted into the cylinder to divide an inside of the cylinder into a rod side chamber and a bottom side chamber; a piston rod connected to the piston; a closing member provided at one end of the cylinder through which the piston rod is inserted and closed; and a rebound control mechanism that operates during an extension stroke of the piston rod when the piston moves toward the closing member in the cylinder. The rebound control mechanism includes: a spring member located between the piston and the closing member and provided on an outer periphery of the piston rod; and a spring receiver provided on the closing member and to which one end of the spring member is attached. The spring receiver includes a tubular portion fixed between the cylinder and the closing member and a second flange portion provided at another end of the tubular portion and extending inward in a radial direction, and is configured to directly or indirectly fix the one end of the spring member by the second flange portion.

Effect of the Invention

According to the embodiment of the present disclosure, it is possible to suppress the sound generated by the spring member during the extension/contraction operation of the piston rod, and thus, it is possible to improve the quietness.

DETAILED DESCRIPTION TO EXECUTE THE INVENTION

Hereinafter, the case where a cylinder device according to an embodiment of the present disclosure is applied to a hydraulic shock absorber will be described in detail with reference to the accompanying drawings. In each drawing, the various passages are illustrated larger than the actual ones so that the shape of the various passages and the flow of hydraulic oil may be clarified. Further, in the embodiment, descriptions will be made on the case where the hydraulic shock absorber is arranged with one end (one side)

as the upper end (upper side) and the other end (the other side) as the lower end (lower side).

Figure 1:
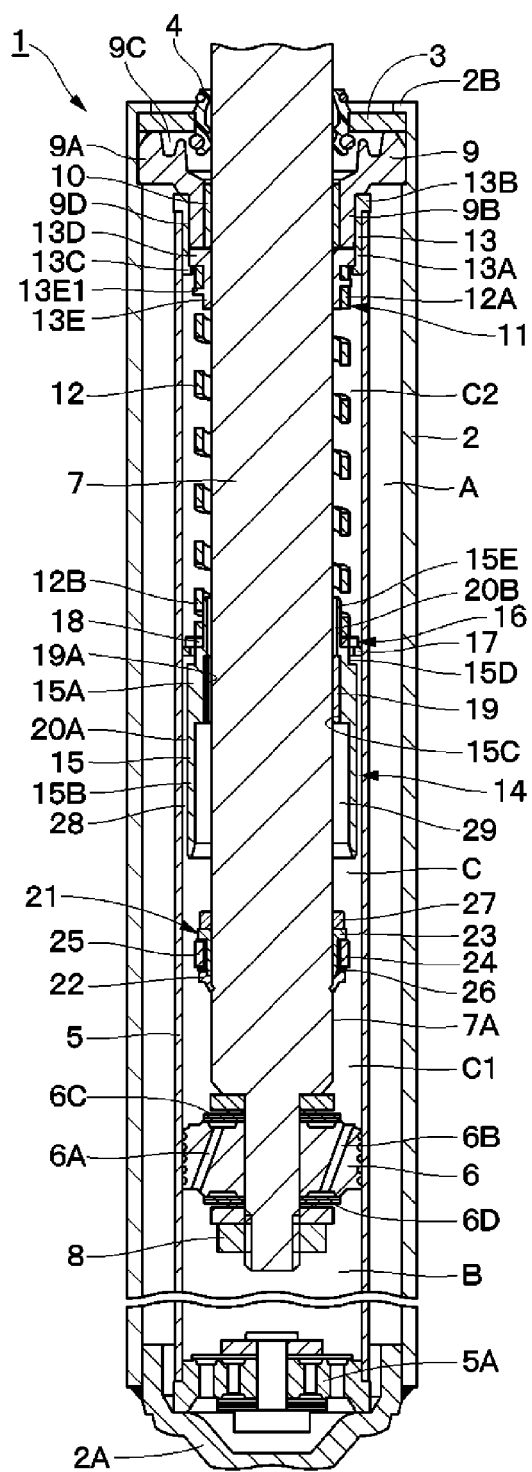
FIG. 1 is a cross-sectional view illustrating a hydraulic shock absorber as a cylinder device according to a first embodiment of the present disclosure.

First, FIGS. 1 to 9 illustrate a first embodiment of the present disclosure. In FIG. 1, a hydraulic shock absorber 1 is configured as a double-cylinder shock absorber including a tubular outer cylinder 2 forming an outer periphery thereof, an inner cylinder 5, a piston 6, a piston rod 7, a rod guide 9, and a stopper mechanism 14, which will be described later.

Figure 2:
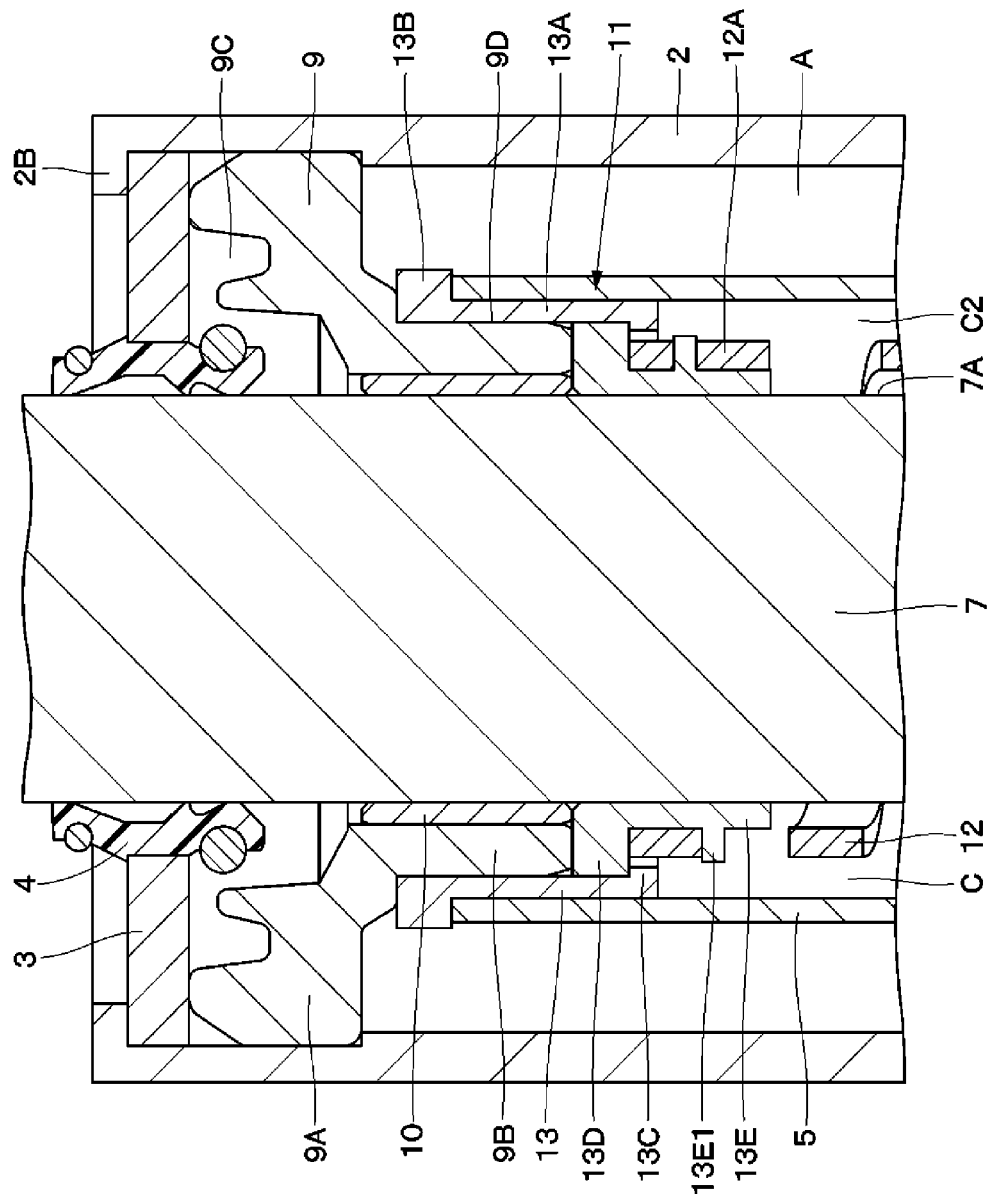
FIG. 2 is an enlarged cross-sectional view illustrating a rod guide and a rebound control mechanism in FIG. 1.

As for the outer cylinder 2 of the hydraulic shock absorber 1, the upper end used as the one end becomes an open end, and the lower end used as the other end becomes a closed end closed by a bottom cap 2A. As illustrated in FIG. 2, a caulking portion 2B bent inward in the radial direction is provided on the upper end (opening end) of the outer cylinder 2. The caulking portion 2B holds a cover 3 that closes the open end of the outer cylinder 2 in a retaining state.

The outer periphery of the cover 3 including an annular disk is fixed by the caulking portion 2B of the outer cylinder 2 in a state of being in contact with the rod guide 9 (to be described later) in order to close the open end of the outer cylinder 2. A rod seal 4 including an elastic material is attached to the inner periphery of the cover 3. The rod seal 4 seals between the cover 3 and the piston rod 7 (to be described later).

The inner cylinder 5 as a cylinder is provided in the outer cylinder 2 with the same central axis. The lower end of the inner cylinder 5 is fixed to the bottom cap 2A in a fitted state via a bottom valve 5A. A rod guide 9 is inserted in a positioned state on the inner circumference of the inner cylinder 5 on the upper end via a spring receiver 13 (to be described later). A hydraulic oil (oil liquid) as a working fluid is sealed in the inner cylinder 5. The working fluid is not limited to the oil solution, and for example, water mixed with additives may be used.

An annular reservoir chamber A is formed between the inner cylinder 5 and the outer cylinder 2. Gas is sealed in the reservoir chamber A together with the above-mentioned hydraulic oil. This gas may be air in an atmospheric pressure state, or gas such as compressed nitrogen gas may be used. The gas in the reservoir chamber A is compressed to compensate for the advance volume of the piston rod 7 when the piston rod 7 is contracted (during the contraction stroke).

The piston 6 is slidably fitted into the inner cylinder 5. The piston 6 divides the inside of the inner cylinder 5 into two chambers, that is, a bottom side chamber B located on the lower side and a rod side chamber C located on the upper side. Further, the piston 6 is formed with oil passages 6A and 6B capable of communicating the bottom side chamber B and the rod side chamber C. Further, when the piston 6 slides downward and displaces due to the contraction of the piston rod 7, a disc valve 6C on the contraction side is arranged on the upper end surface of the piston 6 to give a resistance force to the hydraulic oil flowing through the oil passage 6A to generate a predetermined damping force. Meanwhile, when the piston 6 slides upward and displaces due to the extension of the piston rod 7, a disc valve 6D on the extension side is arranged on the lower end surface of the piston 6 to give a resistance force to the hydraulic oil flowing through the oil passage 6B to generate a predetermined damping force.

The lower end of the piston rod 7 is connected to the piston 6. That is, the lower end of the piston rod 7 is inserted into the inner cylinder 5, and the piston rod 7 is attached to the piston 6 by a nut 8. Further, the upper end of the piston rod 7 protrudes outward and extendably and contractably via a rod guide 9 and a cover 3. The outer peripheral surface 7A of the piston rod 7 is in sliding contact with the guide portion 10 (to be described later) provided on the rod guide 9 and the bush 19 (to be described later) provided on another cylinder 15. Further, the piston rod 7 is provided with an annular groove 7B (see, e.g., FIG. 3) at a position separated from the mounting position of the piston 6 by a predetermined dimension. A fitting portion 22B of a fixture 22 (to be described later) is fixed to the annular groove 7B while being fitted from the outside.

The rod guide 9 is provided at the upper end of the inner cylinder 5. The rod guide 9 constitutes a closing member that closes the upper end of the outer cylinder 2 in a state where the piston rod 7 is inserted. As illustrated in FIG. 2, the rod guide 9 is formed in a stepped cylindrical shape, and is inserted and fixed to the upper end of the outer cylinder 2 and the upper end of the inner cylinder 5. As a result, the rod guide 9 positions the upper portion of the inner cylinder 5 in a coaxial position with the outer cylinder 2 via the spring receiver 13 (to be described later). Further, the rod guide 9 guides the piston rod 7 inserted on the inner periphery to be slidable in the axial direction. The rod guide 9 supports the cover 3 from the inside when the cover 3 is caulked and fixed from the outside by the caulking portion 2B of the outer cylinder 2.

The rod guide 9 is formed in a stepped cylindrical shape by a large diameter portion 9A located on the upper side and inserted into the inner periphery of the outer cylinder 2 and a small diameter portion 9B located on the lower side of the large diameter portion 9A and inserted into the inner cylinder 5. Here, the large diameter portion 9A of the rod guide 9 is provided with an annular oil reservoir 9C surrounding the piston rod 7 on the upper surface side of the large diameter portion 9A facing the cover 3. When the hydraulic oil (including the gas mixed in the hydraulic oil) in the rod side chamber C leaks through a slight gap between the piston rod 7 and the guide portion 10, the oil reservoir 9C is a space for temporarily storing the leaked hydraulic oil.

Further, the large diameter portion 9A of the rod guide 9 is provided with a communication passage (not illustrated) that always communicates with the reservoir chamber A on the outer cylinder 2. This communication passage guides the hydraulic oil (including gas) stored in the oil reservoir 9C to the reservoir chamber A on the outer cylinder 2. A check valve (not illustrated) is provided in the oil reservoir 9C. When the leaked oil increases and overflows in the oil reservoir 9C, the check valve allows the overflowing hydraulic oil to flow toward the communication passage (reservoir chamber A) of the rod guide 9 and blocks the flow in the reverse direction.

The small diameter portion 9B of the rod guide 9 is formed as a cylindrical body having a smaller diameter than the inner cylinder 5. The outer periphery of the small diameter portion 9B is a spring receiving fitting surface 9D. The spring receiving fitting surface 9D is press-fitted to the inner periphery of the tubular portion 13A of the spring receiver 13 (to be described later). Further, a guide portion 10 including a cylindrical bush that guides the piston rod 7 to be slidable in the axial direction is provided on the inner periphery of the small diameter portion 9B. As a result, the small diameter portion 9B is positioned from the inside so that the spring receiver 13 and the upper portion of the inner cylinder 5 are coaxial with the piston rod 7.

Next, the configuration and function of the rebound control mechanism 11, which is a feature of the present embodiment, will be described.

As illustrated in FIG. 1, the rebound control mechanism 11 is located in the inner cylinder 5 and is provided between the rod guide 9 and the other cylinder 15. When the piston 6 is in the extension stroke of the piston rod 7 that moves toward the rod guide 9 in the inner cylinder 5, the rebound control mechanism 11 operates to control (limit) the extension of the piston rod 7. The rebound control mechanism 11 is constituted by a spring member 12 and a spring receiver 13, which will be described later. The spring member 12 also constitutes a part of the stopper mechanism 14 (to be described later).

The spring member 12 constitutes a rebound spring, and is provided in the inner cylinder 5 (rod side chamber C) on the outer periphery of the piston rod 7. Further, the spring member 12 is arranged between the piston 6 and the rod guide 9, specifically, between the other cylinder 15 and the spring receiver 13. The spring member 12 is formed as a compression coil spring in which a metal wire having a spring property is spirally wound at a predetermined interval.

As illustrated in FIG. 2, in the spring member 12, the upper portion 12A, which is one end (the end portion on the rod guide 9), is indirectly attached to the second flange portion 13C of the spring receiver 13. That is, a spring mounting portion 13E of a third flange portion 13D engaged with the second flange portion 13C is fitted to the upper portion 12A of the spring member 12 in a press-fitted state. At this time, in the spring member 12, a fixing portion 13E1 of the spring mounting portion 13E is fixed in the gap between the wires located at the upper portion 12A. As a result, the upper portion 12A of the spring member 12 is securely attached to the spring receiver 13.

Figure 3:
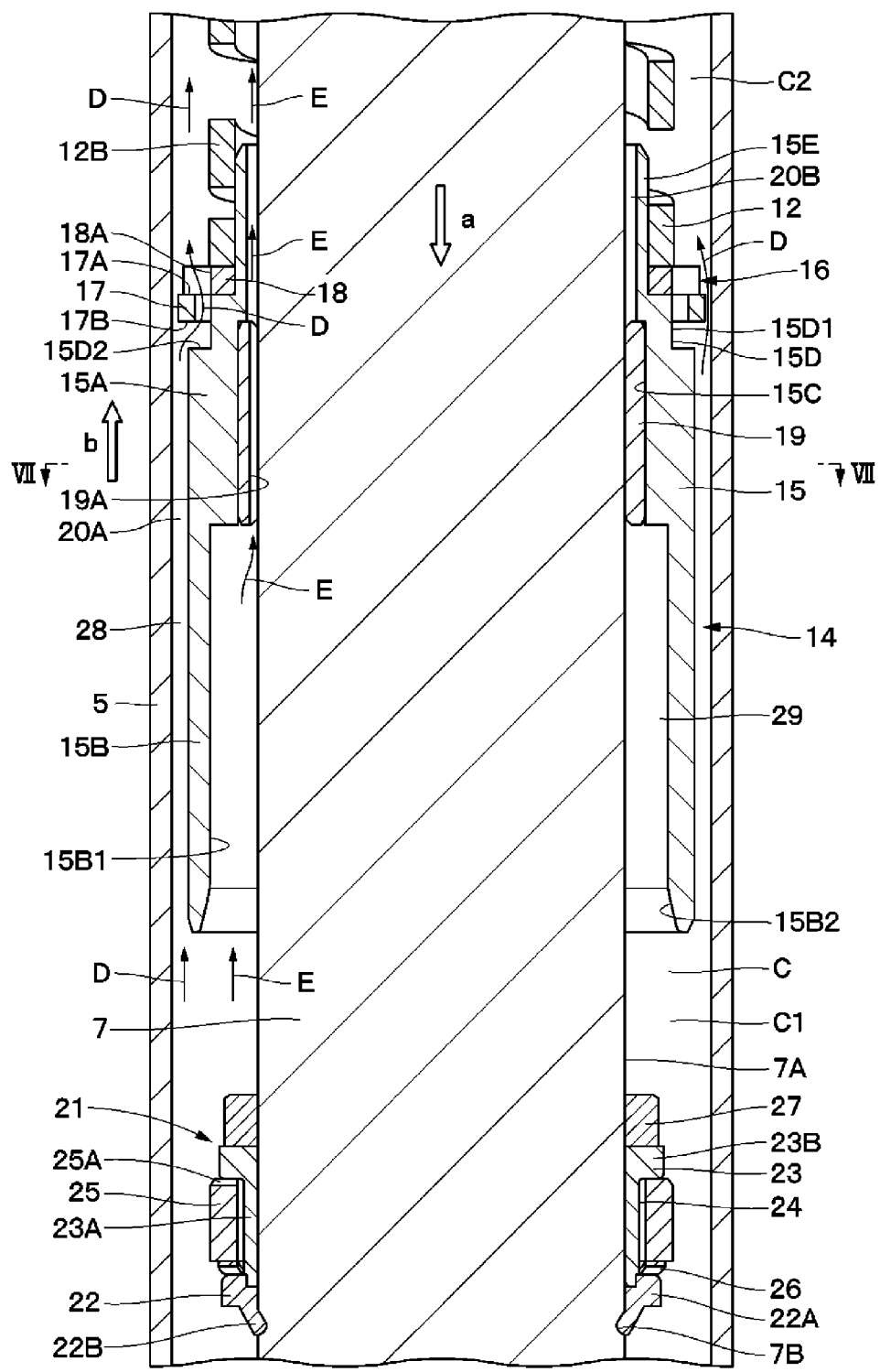
FIG. 3 is a cross-sectional view illustrating an inner cylinder, a resistance unit, and a stopper mechanism in FIG. 1 in a state where a piston rod is contracted.

Meanwhile, as illustrated in FIG. 3, the lower portion 12B, which is the other end of the spring member 12 (the end on the other cylinder 15), is attached to the other cylinder 15. Specifically, the lower portion 12B of the spring member 12 is externally fitted to the outer periphery of a spring mounting cylinder 15E of the other cylinder 15 in a tightly fitted state. As a result, an appropriate gap is secured between the lower portion 12B of the spring member 12 and the piston rod 7 by the other cylinder 15.

Then, the spring member 12 positions the other cylinder 15 in the axial direction in the rod side chamber C except when the piston rod 7 is greatly extended. Further, when the piston rod 7 is greatly extended, the spring member 12 is compressed to suppress the extension of the piston rod 7, and for example, the rolling of the vehicle body when the vehicle is cornering is suppressed.

As illustrated in FIG. 2, the spring receiver 13 is provided on the rod guide 9, that is, on the upper end of the inner cylinder 5. The upper portion 12A of the spring member 12 is attached to the spring receiver 13 in a retaining state. Here, the spring receiver 13 is provided between the rod guide 9 and the inner cylinder 5. As a result, the spring receiver 13 may reduce the size of the rod guide 9, which is generally made of an iron-based metal, as compared with the case where the inner cylinder is supported by the rod guide. Further, by forming the spring receiver 13 using, for example, a light metal material such as an aluminum alloy or a resin material, the weight of the hydraulic shock absorber 1 may be reduced.

The spring receiver 13 is configured to include a tubular portion 13A sandwiched between the inner cylinder 5 and the rod guide 9, a first flange portion 13B which is provided at the upper end of the tubular portion 13A, extends outward in the radial direction, and is positioned axially by the upper end of the inner cylinder 5, a second flange portion 13C which is provided at the lower end of the tubular portion 13A and extends inward in the radial direction, a third flange portion 13D engaged with the second flange portion 13C, and a spring mounting portion 13E provided to protrude from the third flange portion 13D toward the piston 6. The spring mounting portion 13E is press-fitted to the upper portion 12A of the spring member 12. In other words, the upper portion 12A of the spring member 12 is fitted to the outer periphery of the spring mounting portion 13E.

As described above, the spring receiver 13 according to the first embodiment is formed by two members, that is, a stepped cylinder including a tubular portion 13A, a first flange portion 13B, and a second flange portion 13C, and a stepped cylinder including a third flange portion 13D and a spring mounting portion 13E. Therefore, the spring receiver 13 may quickly and inexpensively respond to change in shape (change in specification) of the inner cylinder 5, the piston rod 7, and the spring member 12. The spring receiver 13 may also be used for other hydraulic shock absorbers.

The second flange portion 13C is formed to protrude inward in the radial direction from the tubular portion 13A. As a result, the second flange portion 13C may be fixed in the axial direction with the third flange portion 13D sandwiched between the lower end of the small diameter portion 9B of the rod guide 9. The third flange portion 13D is formed as an annular body extending from the outer peripheral surface 7A of the piston rod 7 to the inner peripheral surface of the tubular portion 13A, and the outer periphery thereof is engaged with the second flange portion 13C.

The spring mounting portion 13E is formed as a cylindrical body extending from the inner diameter of the third flange portion 13D along the outer peripheral surface 7A of the piston rod 7. The upper portion 12A of the spring member 12 is fitted to the spring mounting portion 13E in a tightly fitted state on the outer periphery thereof. Here, one or a plurality of fixing portions 13E1 are provided on the outer periphery of the spring mounting portion 13E to be located in the middle portion in the axial direction and include protrusions protruding outward in the radial direction. The fixing portion 13E1 is inserted into the gap between the wires forming the spring member 12, so that the spring mounting portion 13E and the spring member 12 are firmly connected. As a result, the spring receiver 13 may indirectly fix the upper portion 12A of the spring member 12 by the second flange portion 13C.

Further, the spring member 12 may be attached to the spring receiver 13 in advance before the spring receiver 13 is inserted into the inner cylinder 5. Therefore, it is possible to prevent foreign substances, such as chips and abrasion powder, generated when the spring receiver 13 is press-fitted into the spring member 12 from being mixed into the inner cylinder 5.

The stopper mechanism 14 is located in the inner cylinder 5 and is provided between the rod guide 9 and the piston 6. When the piston 6 is in the extension stroke of the piston rod 7 that moves toward the rod guide 9 in the inner cylinder 5, the stopper mechanism 14 operates. When the piston rod 7 is extended, the stopper mechanism 14 limits the extension operation of the piston rod 7 while applying stepwise braking (hydraulic resistance) so as not to exceed the full extension limit. The stopper mechanism 14 includes the above-mentioned spring member 12, another cylinder 15 (to be described later), a resistance unit 16, another piston 21, and a bush 19.

The other cylinder 15 is provided to be movable with respect to the piston rod 7. Further, the other cylinder 15 is attached to the lower portion 12B of the spring member 12 and may move up and down in the inner cylinder 5. In the other cylinder 15, the rod side chamber C is divided into a chamber C1 on the piston 6 and a chamber C2 on the rod guide 9. Since the other cylinder 15 is not in contact with either the inner cylinder 5 or the piston rod 7 as described later, the other cylinder 15 may be formed by using an optimum material, for example, a light metal material such as an aluminum alloy or a resin material, without being affected by the materials of the inner cylinder 5 and the piston rod 7.

As illustrated in FIGS. 3 to 6, the other cylinder 15 includes a bottom portion 15A on the rod guide 9 of the inner cylinder 5 and a tubular portion 15B extending from the bottom portion 15A toward the piston 6. Here, the outer diameters of the bottom portion 15A and the tubular portion 15B are set to be slightly smaller than the outer diameter of the inner cylinder 5. Meanwhile, the inner diameter of the bottom portion 15A is set to be slightly larger than that of the piston rod 7. The inner diameter of the tubular portion 15B is set to be larger than that of the piston rod 7 so that another piston 21 (to be described later) may be advanced thereinto.

Figure 7:
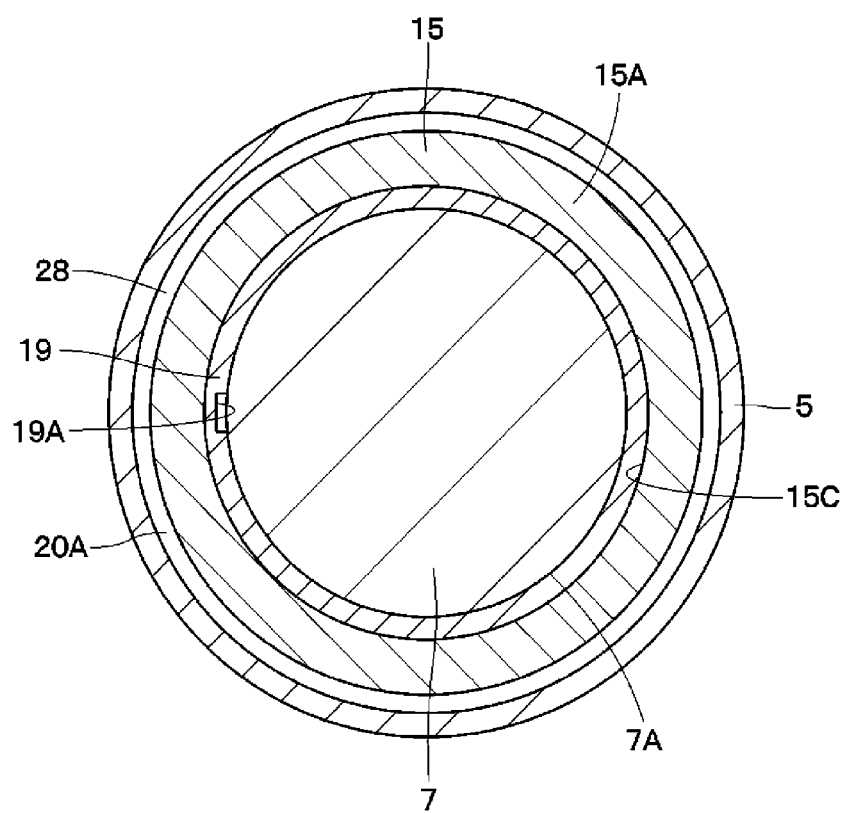
FIG. 7 is an enlarged cross-sectional view of an inner cylinder, a piston rod, another cylinder, and a bush from the direction illustrated by the arrow VII-VII in FIG. 3.
Figure 8:
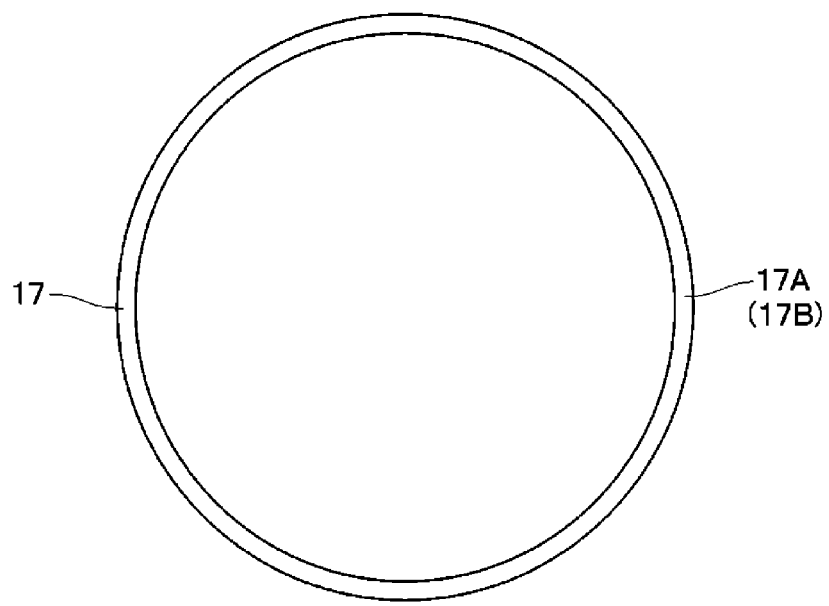
FIG. 8 is a plan view illustrating an axially moving member constituting the resistance unit in FIG. 2 as a single unit.
Figure 9:
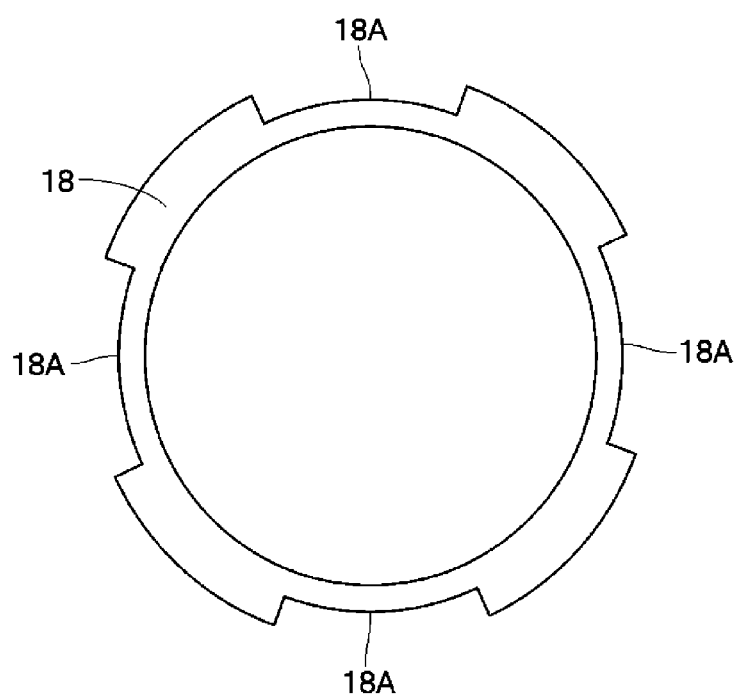
FIG. 9 is a plan view illustrating a fixing member constituting the resistance unit in FIG. 2 as a single unit.

As a result, as illustrated in FIG. 7, an annular gap 20A is formed among the inner cylinder 5, the bottom portion 15A, and the tubular portion 15B. The annular gap 20A allows hydraulic oil to flow between the chamber C1 on the piston 6 and the chamber C2 on the rod guide 9. Further, the annular gap 20A prevents the other cylinder 15 from coming into contact with the inner cylinder 5.

The inner periphery of the bottom portion 15A is a bush insertion portion 15C for inserting the bush 19. A stepped portion 15D is formed on the outer periphery of the bottom portion 15A by reducing the diameter of the upper portion. The stepped portion 15D is formed by a cylindrical surface 15D1 and an annular valve seat 15D2 located on the lower end of the cylindrical surface 15D1 and on which an axially moving member 17 (to be described later) is seated. A spring mounting cylinder 15E protruding upward from the inner diameter is provided on the upper portion of the bottom portion 15A. The lower portion 12B of the spring member 12 is fitted into the spring mounting cylinder 15E in a tightly fitted state. Further, a fixing member 18 (to be described later) is externally fitted to the spring mounting cylinder 15E in a state of being sandwiched between the spring member 12 and the bottom portion 15A. The inner peripheral surface of the spring mounting cylinder 15E is separated from the outer peripheral surface 7A of the piston rod 7 so as not to come into contact with the outer peripheral surface 7A of the piston rod 7.

The lower end of the inner peripheral surface 15B1 of the tubular portion 15B is formed in a tapered surface portion 15B2 that gradually extends. When the piston rod 7 is extended, the tapered surface portion 15B2 smoothly guides another piston 21 that is moved upward together with the piston rod 7 into the tubular portion 15B.

The resistance unit 16 is provided between the inner cylinder 5 as a cylinder and another cylinder 15. The resistance unit 16 includes an axially moving member 17 and a fixing member 18.

The axially moving member 17 includes an annular body having a rectangular cross section (see, e.g., FIG. 8), and is provided to surround the stepped portion 15D of another cylinder 15. The axially movable member 17 is movable in the axial direction with respect to the other cylinder 15. The outer diameter of the axially moving member 17 is set to be smaller than the inner diameter of the inner cylinder 5. Meanwhile, the inner diameter of the axially moving member 17 is set to be larger than the outer diameter of the cylindrical surface 15D1 of the stepped portion 15D and smaller than the outer diameter of the annular valve seat 15D2. As a result, the axially moving member 17 forms an annular passage through which hydraulic oil flows between the inner peripheral surface and the cylindrical surface 15D1 of the stepped portion 15D. Further, the inner diameter dimension of the axially moving member 17 will be described in detail. The diameter of the inner peripheral surface is set to be larger than the outer diameter of the cylindrical surface 15D1 so that the hydraulic oil may flow smoothly between the chamber C1 on the piston 9 and the chamber C2 on the rod guide 9, that is, a large flow resistance is not generated.

Figure 4:
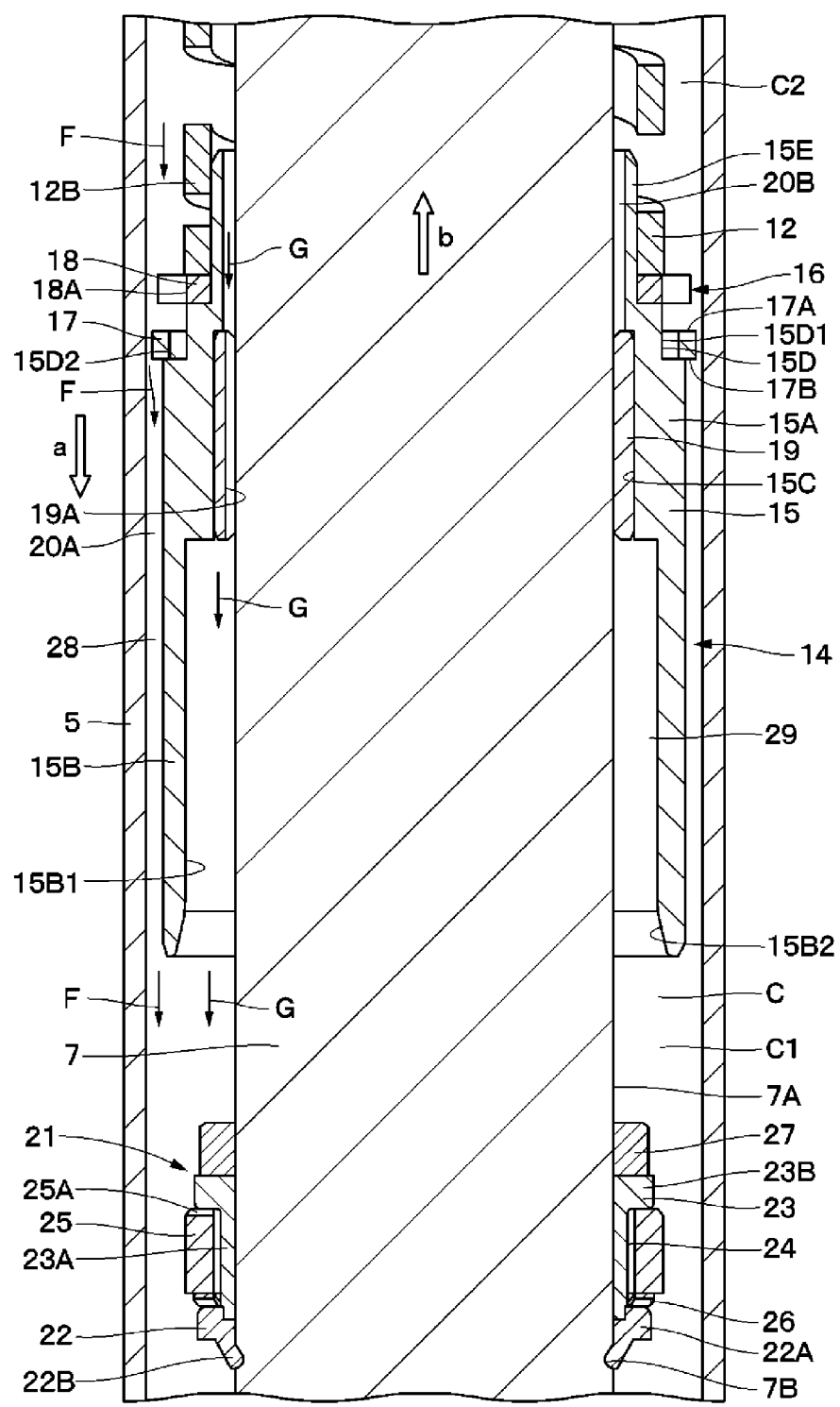
FIG. 4 is a cross-sectional view of an inner cylinder, a resistance unit, and a stopper mechanism at the same position as in FIG. 3, illustrating a state in which a piston rod is extended.

Further, the axially moving member 17 has an upper surface 17A and a lower surface 17B. As illustrated in FIG. 3, the upper surface 17A of the axially moving member 17 abuts on and is separated from the lower surface of the fixing member 18. Meanwhile, as illustrated in FIG. 4, the lower surface 17B of the axially moving member 17 abuts on the annular valve seat 15D2 of the stepped portion 15D so that the valve may be opened and closed. As described above, the axially moving member 17 constitutes an annular valve body.

The fixing member 18 is attached to the spring mounting cylinder 15E constituting the other cylinder 15 in a state of being fitted from the outside. The fixing member 18 includes an annular body having a rectangular cross section, and is provided with a plurality of, for example, four notched portions 18A (see, e.g., FIG. 9) at intervals in the circumferential direction on the outer periphery thereof. Each notched portion 18A constitutes a passage portion. The outer diameter of the fixing member 18 is set to be larger than the inner diameter of the axially moving member 17. As a result, the fixing member 18 functions as a retaining member for the axially moving member 17. Further, even when the upper surface 17A of the axially moving member 17 is in contact, each notched portion 18A may allow hydraulic oil to flow smoothly between the chamber C1 on the piston 6 and the chamber C2 on the rod guide 9.

As illustrated in FIG. 4, when the piston rod 7 extends in the direction of arrow b, the resistance unit 16 brings the lower surface 17B of the axially moving member 17 into contact with the annular valve seat 15D2 of the stepped portion 15D of the other cylinder 15. As a result, the resistance unit 16 may increase the flow resistance of the hydraulic oil by using a slight gap between the outer peripheral surface of the axially moving member 17 and the inner peripheral surface of the inner cylinder 5 as a throttle passage. Further, as illustrated in FIG. 3, when the piston rod 7 contracts in the direction of arrow a, since the upper surface 17A of the axially moving member 17 is separated from the annular valve seat 15D2 of the stepped portion 15D, the hydraulic oil may be circulated with low resistance.

As indicated by arrows D and E in FIG. 3, when the piston rod 7 contracts in the direction of arrow a, the resistance unit 16 may allow a large amount of hydraulic oil to flow from the chamber C1 on the piston 6 to the chamber C2 on the rod guide 9. Meanwhile, as indicated by arrows F and G in FIG. 4, when the piston rod 7 extends in the direction of arrow b, the resistance unit 16 circulates only a small amount of hydraulic oil from the chamber C2 on the rod guide 9 toward the chamber C1 on the piston 6.

The bush 19 is an example of a sliding contact member, and is provided between the piston rod 7 and another cylinder 15. The bush 19 is press-fitted into the bush insertion portion 15C of another cylinder 15. The bush 19 is formed as a cylindrical body using, for example, a metal material such as a copper alloy which has self-lubricating property and abrasion resistance, or a resin material. The inner peripheral surface of the bush 19 is in sliding contact with the outer peripheral surface of the piston rod 7. As a result, the bush 19 always arranges the other cylinder 15 coaxially with the piston rod 7.

Therefore, since the other cylinder 15 is arranged coaxially (in concentric circles) with the inner cylinder 5 and the piston rod 7 by the radial positioning function of the bush 19, an annular gap 20A is formed over the entire circumference among the inner cylinder 5, the bottom portion 15A of the other cylinder 15, and the tubular portion 15B as illustrated in FIG. 7. Further, as illustrated in FIG. 3, an annular gap 20B is formed over the entire circumference between the outer peripheral surface 7A of the piston rod 7 and the inner peripheral surface of the spring mounting cylinder 15E of the other cylinder 15. That is, the bush 19 always keeps the inner cylinder 5 and the other cylinder 15 away from each other so that they do not contact with each other, and always keeps the piston rod 7 and the other cylinder 15 away from each other so that they do not come into contact with each other. Thus, the other cylinder 15 does not cause damage such as scuffing due to contact with the inner cylinder 5 and the piston rod 7. As a result, the other cylinder 15 may be formed by using a material that is optimal in terms of functionality and cost without being affected by the materials of the inner cylinder 5 and the piston rod 7.

Meanwhile, on the inner periphery of the bush 19, a communication passage 19A is provided between the piston rod 7 and the other cylinder 15 by notching the entire length in the axial direction. The communication passage 19A constitutes a part of an inner peripheral passage 29 (to be described later) in which hydraulic oil is circulated between the chamber C1 on the piston 6 and the chamber C2 on the rod guide 9 together with the annular gap 20B. When the piston rod 7 is greatly extended, the hydraulic oil that has passed through the communication passage 19A is further subjected to resistance by another piston 21 (to be described later), so that the extension operation of the piston rod 7 is suppressed.

The other piston 21 moves with the movement of the piston rod 7 and is provided to be fitted in the other cylinder 15. As illustrated in FIG. 1, the other piston 21 is provided between the piston 6 and the other cylinder 15 and constitutes a part of the stopper mechanism 14. The other piston 21 moves (displaces) in the inner cylinder 5 integrally with the piston rod 7 as the piston rod 7 moves (extends and contracts). Further, the other piston 21 is fitted into the other cylinder 15 when the piston rod 7 is greatly extended.

The other piston 21 includes a fixture 22 coupled to the piston rod 7, a castle 23 located above the fixture 22, a piston ring 25 and a wave washer 26 located between the fixture 22 and the castle 23, and a cushion member 27 located above the castle 23.

The fixture 22 is located on the lower portion of the other piston 21, and is fitted to the annular groove 7B on the outer periphery of the piston rod 7 in a retaining state. The fixture 22 is formed using a metal material and includes a base portion 22A and a fitting portion 22B. The fixture 22 attaches the castle 23 to the piston rod 7 in a retaining state, and restricts the axial movement of the piston ring 25.

The fitting portion 22B is located on the inner periphery of the lower end of the base portion 22A of the fixture 22, and is fitted in the annular groove 7B of the piston rod 7. As a result, the fixture 22 is entirely fixed to the piston rod 7 in a state of preventing slippage and rotation. The fitting portion 22B is fitted in the annular groove 7B in a retaining state by, for example, processing using a metal flow.

The castle 23 is located above the fixture 22 and is provided to be inserted through the outer periphery of the piston rod 7. The castle 23 is formed using, for example, a metal material. The castle 23 includes a tubular portion 23A and a flange portion 23B. The castle 23 is formed in a stepped cylindrical shape by a cylindrical tubular portion 23A along the outer peripheral surface of the piston rod 7 and a flange portion 23B having an enlarged diameter on the upper side of the tubular portion 23A. The outer periphery of the tubular portion 23A is formed in a ring groove 24. The lower end of the tubular portion 23A is attached to the upper portion of the base portion 22A of the fixture 22.

The lower end surface of the cushion member 27 (to be described later) is in contact with the upper end surface of the flange portion 23B. Meanwhile, the lower end surface of the flange portion 23B is in contact with the upper end surface of the piston ring 25, and the piston ring 25 is restricted from coming off to the rod guide 9.

The ring groove 24 is located between the fixture 22 and the castle 23, and is formed on the outer peripheral surface of the tubular portion 23A of the castle 23. The ring groove 24 is formed by the fixture 22 and the castle 23 as a peripheral groove having a rectangular space in cross section. That is, the upper end surface of the base portion 22A of the fixture 22 constitutes the lower end surface of the ring groove 24. The lower end surface of the flange portion 23B of the castle 23 constitutes the upper end surface of the ring groove 24. A piston ring 25 is loosely fitted in the ring groove 24 to be displaceable within a predetermined range in the axial direction.

Here, the ring groove 24 constitutes a check mechanism having a throttle function together with the piston ring 25 and the wave washer 26 (to be described later). This check mechanism suppresses the flow of hydraulic oil to generate a damping force. This check mechanism cuts off communication in the other cylinder 15 during the extension stroke of the piston rod 7 (although there is communication due to a slight gap, the operation as the hydraulic shock absorber 1 is in a cut-off state) and enables communication in the other cylinder 15 during the contraction stroke.

The piston ring 25 is arranged with a gap on the outer periphery of the ring groove 24, and is provided in a retaining state between the fixture 22 and the castle 23. Further, the piston ring 25 may be slightly displaced in the axial direction between the upper end surface of the base portion 22A and the lower end surface of the flange portion 23B. The piston ring 25 is formed in an annular shape using, for example, a metal material such as a copper alloy having self-lubricating property and wear resistance. The piston ring 25 is configured to be able to extend or contract in diameter by a C-shaped ring in which an intermediate portion (one location) in the circumferential direction is cut. Therefore, when the piston ring 25 is advanced into the tubular portion 15B of another cylinder 15, the outer peripheral surface of the piston ring 25 is in sliding contact with the inner peripheral surface of the tubular portion 15B. As a result, the outer peripheral surface of the piston ring 25 may seal between the tubular portion 15B and the other piston 21, and the flow of hydraulic oil may be restricted.

The piston ring 25 is detachably mounted in the ring groove 24. The piston ring 25 in the free length state (free state in which no external force is applied) has its outer diameter set to be smaller than the inner diameter of the inner cylinder 5 and slightly larger than the inner diameter of the tubular portion 15B. Further, the corners of the upper outer periphery of the piston ring 25 are chamfered so that the piston ring 25 may be smoothly advanced into the tubular portion 15B.

Here, a notch groove 25A is provided in the upper part of the piston ring 25 by notching a part of the upper end surface thereof in the radial direction. When the upper end surface of the piston ring 25 abuts on the lower end surface of the flange portion 23B of the castle 23, the notch groove 25A allows hydraulic oil to flow between the upper end surface of the piston ring 25 and the lower end surface of the flange portion 23B of the castle 23.

The wave washer 26 is located in the ring groove 24 and is provided in a sandwiched state between the upper end surface of the base portion 22A of the fixture 22 and the lower end surface of the piston ring 25. The wave washer 26 urges the base portion 22A and the piston ring 25 in a direction in which they are separated from each other in the axial direction (upward and downward). That is, the wave washer 26 always urges the piston ring 25 to one end (rod guide 9).

Figure 5:
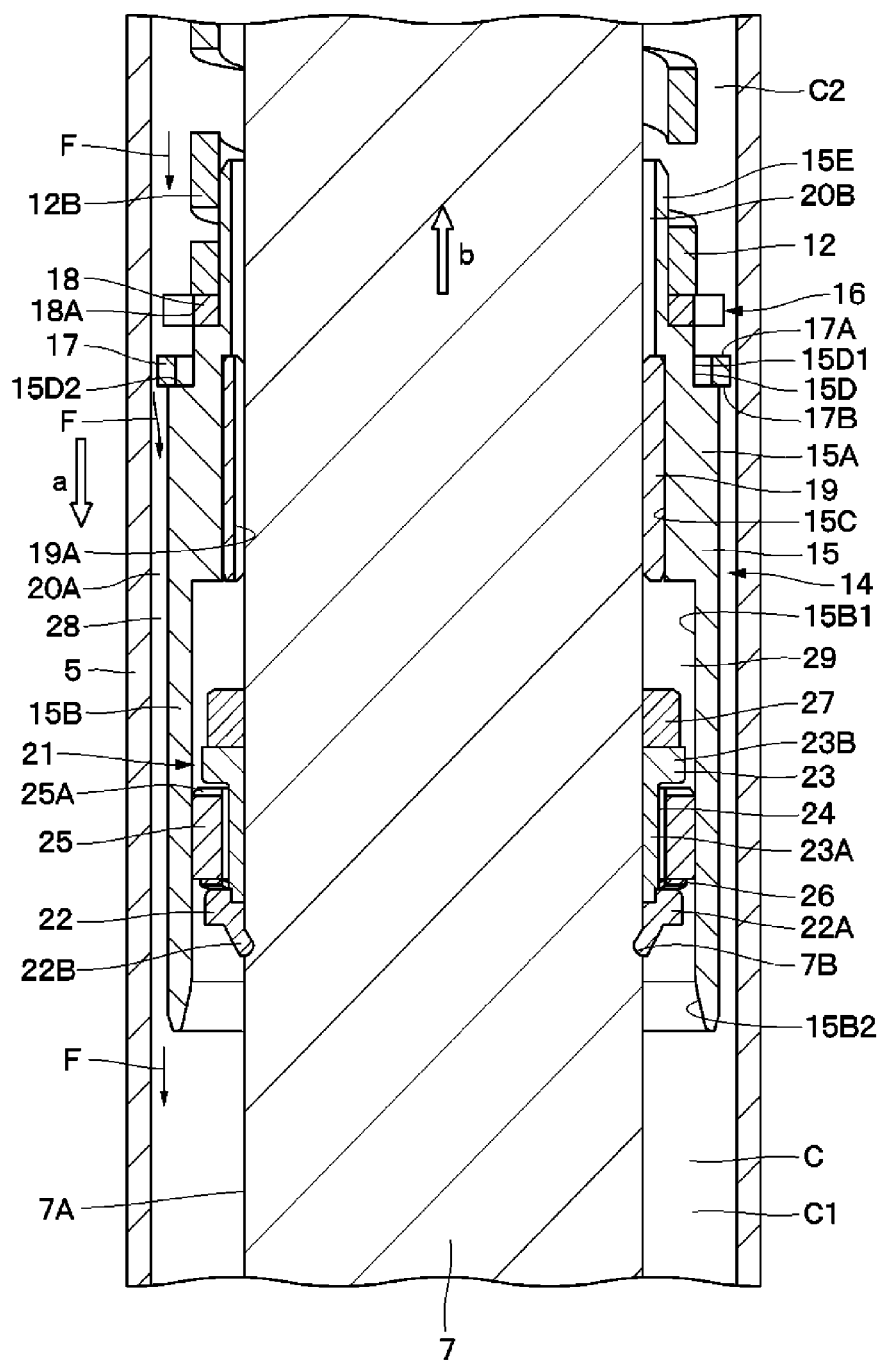
FIG. 5 is a cross-sectional view illustrating an inner cylinder, a resistance unit, and a stopper mechanism in a state where a piston rod is greatly extended.
Figure 6:
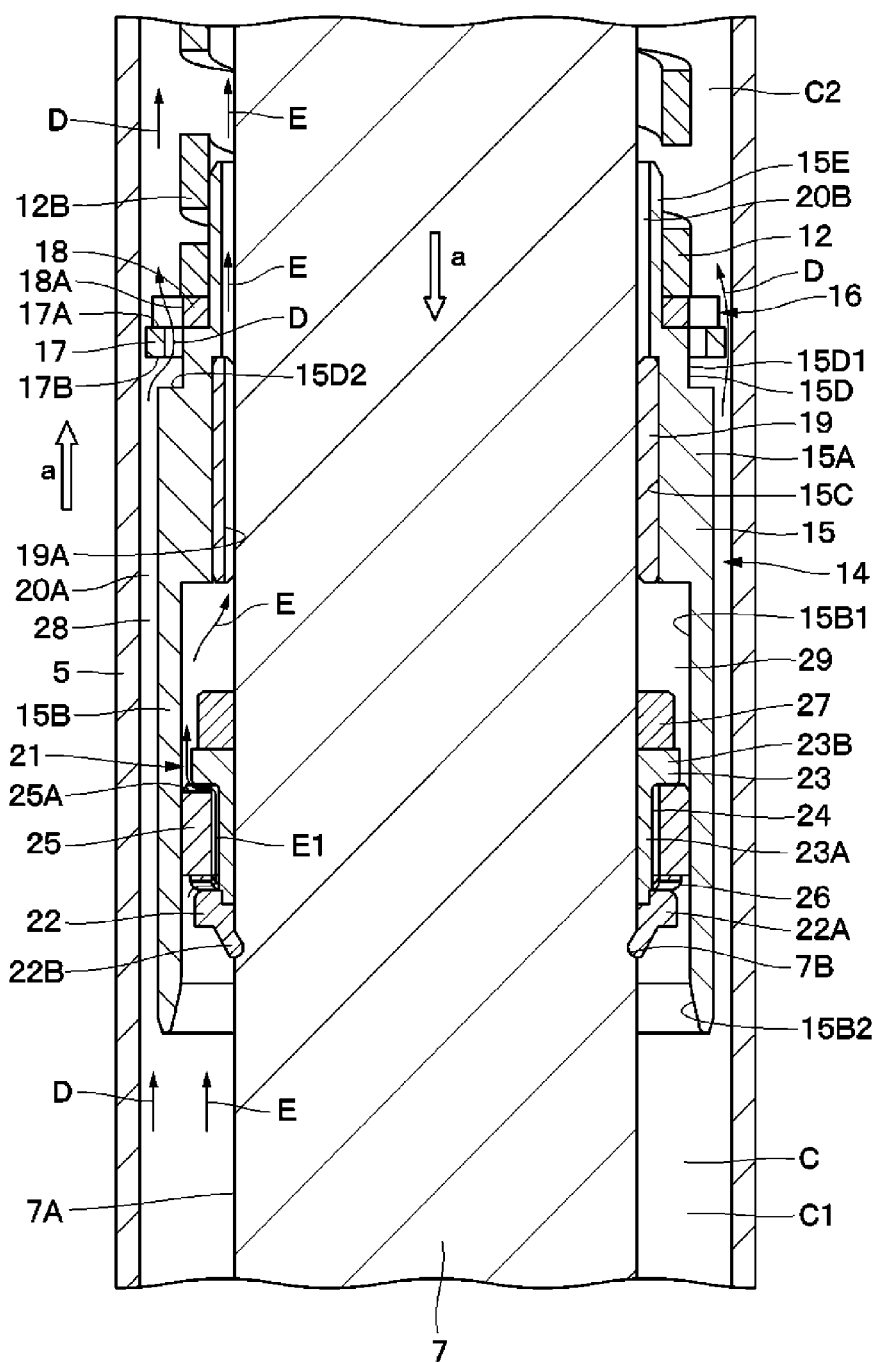
FIG. 6 is a cross-sectional view of an inner cylinder, a resistance unit, and a stopper mechanism as viewed from the same position as in FIG. 5, in a state where a piston rod is greatly extended and then contracted.

As a result, as illustrated in FIG. 5, when the piston rod 7 is greatly contracted, the wave washer 26 is crushed by the piston ring 25 to block communication (flow of hydraulic oil) in the other cylinder 15. At this time, there is a slight gap among the wave washer 26, the base portion 22A of the fixture 22, and the piston ring 25. However, this gap is not involved in the operation of the hydraulic shock absorber 1, and is substantially in a cut-off state. Meanwhile, as illustrated in FIG. 6, when the piston rod 7 is contracted, the wave washer 26 suppresses the contact between the upper end surface of the base portion 22A and the lower end surface of the piston ring 25. As a result, the wave washer 26 forms a gap between the upper end surface of the base portion 22A and the lower end surface of the piston ring 25 to allow the hydraulic oil to flow.

The cushion member 27 is provided above the flange portion 23B of the castle 23. The cushion member 27 is a collision-preventing cushioning member provided on the outer periphery of the piston rod 7 and reduces the impact when another piston 21 collides with the tubular portion 15B of the other cylinder 15. The cushion member 27 is formed as a tubular body using an elastically deformable resin material (rubber material). As a result, even when another piston 21 collides (contacts) with the tubular portion 15B of the other cylinder 15 at the time of maximum extension of the piston rod 7, the impact at this time is alleviated and the piston rod 7 is restricted from extending further.

The hydraulic shock absorber 1 according to the present embodiment is configured as described above. Then, in the hydraulic shock absorber 1, the upper end of the piston rod 7 is attached to the vehicle body of the automobile, and the bottom cap 2A (lower end) of the outer cylinder 2 is attached to the axle (neither is illustrated). As a result, in a case where vibration occurs while the vehicle is running, when the piston rod 7 contracts and extends in the axial direction from the inner cylinder 5 and the outer cylinder 2, a damping force is generated on the contraction side and the extension side by the disc valves 6C and 6D of the piston 6, so that the vibration may be buffered to damp the upper and lower vibrations of the vehicle.

Here, in the hydraulic shock absorber 1, it is difficult to suppress the full extension of the piston rod 7 and to control the switching operation of the piston rod 7 from the fully extended state to the contracted state. For this reason, stable resistance may not be obtained and the ride quality is deteriorated. However, in the present embodiment, it is possible to stably control the resistance force at the time of full extension of the piston rod 7 and contraction operation from the full extension.

That is, with reference to FIGS. 3 to 6, descriptions will be made on the hydraulic shock absorber 1 according to the present embodiment in which the resistance force is controlled when the piston rod 7 is contracted, the resistance force is controlled when the piston rod 7 is extended toward the fully extended position, and the switching operation from the fully extended position to the contracted position is controlled.

First, FIG. 3 illustrates a normal contraction stroke of the piston rod 7 regardless of the full extension of the piston rod 7. In the contraction stroke, the piston rod 7 moves in the direction of arrow a. At this time, the axially moving member 17 of the resistance unit 16 moves in the direction of arrow b and comes into contact with the fixing member 18.

As a result, the hydraulic oil in the chamber C1 on the piston 6 flows into the chamber C2 on the rod guide 9 through an outer peripheral passage 28 that includes an annular gap 20A formed among the inner cylinder 5, the bottom portion 15A of the other cylinder 15, and the tubular portion 15B and each notched portion 18A of the fixing member 18 and an inner peripheral passage 29 that includes an annular gap formed between the outer peripheral surface of the piston rod 7 and the tubular portion 15B of the other cylinder 15, and an annular gap among the communication passage 19A of the bush 19, the outer peripheral surface of the piston rod 7, and the spring mounting cylinder 15E of another cylinder 15. At this time, in the outer peripheral passage 28, a large passage area is secured by each notched portion 18A of the fixing member 18, and a large amount of hydraulic oil may be circulated.

Further, in the inner peripheral passage 29, the other piston 21 is not advanced into the tubular portion 15B of the other cylinder 15. Therefore, the hydraulic oil in the chamber C1 on the piston 6 may be circulated to the chamber C2 on the rod guide 9 through the communication passage 19A of the bush 19. That is, in the extension stroke of the piston rod 7 illustrated in FIG. 3, both the outer peripheral passage 28 and the inner peripheral passage 29 are open, and are in a fully open state where the resistance given to the circulating hydraulic oil is minimized.

Meanwhile, FIG. 4 illustrates the extension stroke of the normal piston rod 7 in which the other piston 21 is not advanced into the tubular portion 15B of the other cylinder 15. In the extension stroke, the piston rod 7 moves in the direction of arrow b. At this time, the axially moving member 17 of the resistance unit 16 moves in the direction of arrow a and comes into contact with the annular valve seat 15D2 of the stepped portion 15D. In this case, the annular gap 20A between the inner cylinder 5 and the other cylinder 15 is partially closed by the axially moving member 17. However, the hydraulic oil in the chamber C2 on the rod guide 9 may flow to the chamber C1 on the piston 6 through the inner peripheral passage 29 in the fully open state.

Therefore, in the normal contraction and extension strokes which are not related to the full extension of the piston rod 7, the hydraulic shock absorber 1 may generate a stable damping force by the disc valves 6C and 6D of the piston 6 and the bottom valve 5A to improve the riding comfort.

FIG. 5 illustrates an extension stroke when the piston rod 7 is greatly extended toward the fully extended position. In this extension stroke, the piston rod 7 moves upward in the direction of arrow b, and hydraulic oil flows from the chamber C2 on the rod guide 9 to the chamber C1 on the piston 6 through the outer peripheral passage 28 and the inner peripheral passage 29.

At this time, the axially moving member 17 of the resistance unit 16 moves in the direction of arrow a and comes into contact with the annular valve seat 15D2 of the stepped portion 15D. As a result, the annular gap 20A between the inner cylinder 5 and the other cylinder 15 is in a state of being narrowed by the axially moving member 17.

Further, when the piston rod 7 is greatly extended, the other piston 21 of the stopper mechanism 14 is slidably inserted (advanced) into the tubular portion 15B of the other cylinder 15. At this time, the outer peripheral surface of the piston ring 25 is in sliding contact with the inner peripheral surface 15B1 of the tubular portion 15B. Further, the piston ring 25 is displaced relative to the axial direction between the base portion 22A of the fixture 22 and the flange portion 23B of the castle 23. That is, as illustrated in FIG. 5, the lower end surface of the piston ring 25 crushes the wave washer 26 against the urging force. As a result, the base portion 22A of the fixture 22, the piston ring 25, and the wave washer 26 are in close contact with each other through a slight gap, so that the flow of hydraulic oil in the hydraulic shock absorber 1 is cut off. At this time, when the extension speed of the piston rod 7 is high, the pressure in the other cylinder 15 rises, and a force for compressing the spring member 12 acts. Further, as the advance of the other piston 21 into the other cylinder 15 progresses, a force is generated to reduce the spring member 12 to a position where the pressure in the other cylinder 15 and the reaction force of the spring member 12 are balanced.

Therefore, the piston rod 7 is greatly extended, and the hydraulic oil is circulated only in the outer peripheral passage 28 narrowed by the axially moving member 17 in a state where the other piston 21 is advanced together with the piston ring 25 to be inserted into the other cylinder 15 (the piston rod 7 is fully extended). Thus, a large flow resistance may be generated with respect to the extension operation of the piston rod 7. As a result, it is possible to give a hydraulic cushioning action to the displacement of the piston rod 7 in the extension direction, and it is possible to suppress the full extension of the piston rod 7. At this time, the spring member 12 contracts in synchronization with the extension operation of the piston rod 7.

Further, even when the piston rod 7 is maximally extended to a position where the cushion member 27 collides with the lower surface of the bottom portion 15A of the other cylinder 15, at this time, the cushion member 27 for preventing collision is elastically deformed, so that the impact may be alleviated and the further extension operation of the piston rod 7 may be suppressed.

Meanwhile, FIG. 6 illustrates the contraction stroke when the piston rod 7 is switched from the fully extended position to the contracted position. In this contraction stroke, the check mechanism operates so that the piston ring 25 is displaced upward by the urging force of the wave washer 26 and the piston ring 25 in sliding contact with the tubular portion 15B of the other cylinder 15. That is, the upper end surface of the piston ring 25 abuts on the lower end surface of the flange portion 23B of the castle 23.

However, in this case, since the notch groove 25A is provided on the upper end surface of the piston ring 25, a passage through which hydraulic oil flows is formed between the upper end surface of the piston ring 25 and the flange portion 23B of the castle 23 as indicated by arrow E1. Therefore, in the contraction stroke of the piston rod 7, the notch groove 25A of the piston ring 25 may allow the hydraulic oil to smoothly flow from the lower side to the upper side of the other piston 21 into the other cylinder 15, and the piston rod 7 may be smoothly contracted.

Thus, according to the present embodiment, the rebound control mechanism 11 that operates when the piston 6 moves toward the rod guide 9 in the inner cylinder 5 during the extension stroke of the piston rod 7 includes a spring member 12 located between the piston 6 and the rod guide 9 and provided on the outer periphery of the piston rod 7, and a spring receiver 13 provided on the rod guide 9 and to which the upper portion 12A of the spring member 12 is attached. The spring receiver 13 includes a tubular portion 13A sandwiched between the inner cylinder 5 and the rod guide 9, a first flange portion 13A provided at the upper end of the tubular portion 13A, extending outward in the radial direction, and positioned axially by the upper end of the inner cylinder 5, and a second flange portion provided at the lower end of the tubular portion 13A and extending inward in the radial direction. Further, the upper end of the spring member 12 is indirectly fixed by the second flange portion 13C.

Therefore, even when the piston rod 7 extends and contracts, the upper end of the spring member 12 is fixed to the spring receiver 13. Thus, it is possible to suppress the generation of collision noise during the extension/contraction operation of the piston rod 7. As a result, the quietness when the hydraulic shock absorber 1 operates may be improved.

Further, the spring receiver 13 is provided between the rod guide 9 and the inner cylinder 5. Thus, the rod guide 9 made of iron-based metal may be downsized by the amount that the spring receiver 13 is provided. In addition, the spring receiver 13 is formed by using, for example, a light metal material such as an aluminum alloy or a resin material. As a result, the weight of the hydraulic shock absorber 1 may be reduced.

Further, the spring member 12 may be attached to the spring receiver 13 in advance before being inserted into the inner cylinder 5. Therefore, it is possible to prevent foreign substances, such as chips and abrasion powder, generated when the spring receiver 13 is press-fitted into the spring member 12 from being mixed into the inner cylinder 5.

The spring receiver 13 includes a third flange portion 13D engaged with the second flange portion 13C and a spring mounting portion 13E which is provided to protrude from the third flange portion 13D toward the piston 6 and is press-fitted to the upper end of the spring member 12. That is, the spring receiver 13 is formed by two members, that is, a stepped cylinder including a tubular portion 13A, a first flange portion 13B, and a second flange portion 13C, and a stepped cylinder including a third flange portion 13D and a spring mounting portion 13E.

Therefore, the spring receiver 13 may promptly and inexpensively change the shape (specification) of the inner cylinder 5, the piston rod 7, and the spring member 12 by exchanging at least one of the above-mentioned two stepped cylinders with another cylinder. Further, the spring receiver 13 may also be used for other hydraulic shock absorbers having different specifications.

A fixing portion 13E1 fixed to a gap between the wires forming the spring member 12 is formed to protrude from the spring mounting portion 13E. As a result, the spring receiver 13 may integrally fix the spring member 12 by inserting the fixing portion 13E1 of the spring mounting portion 13E into the gap between the wires forming the spring member 12.

The rod guide 9 is press-fitted to the inner periphery of the tubular portion 13A of the spring receiver 13. Therefore, the rod guide 9 and the spring receiver 13 may be integrally assembled by press-fitting, and the assembly work may be easily performed.

Figure 10:
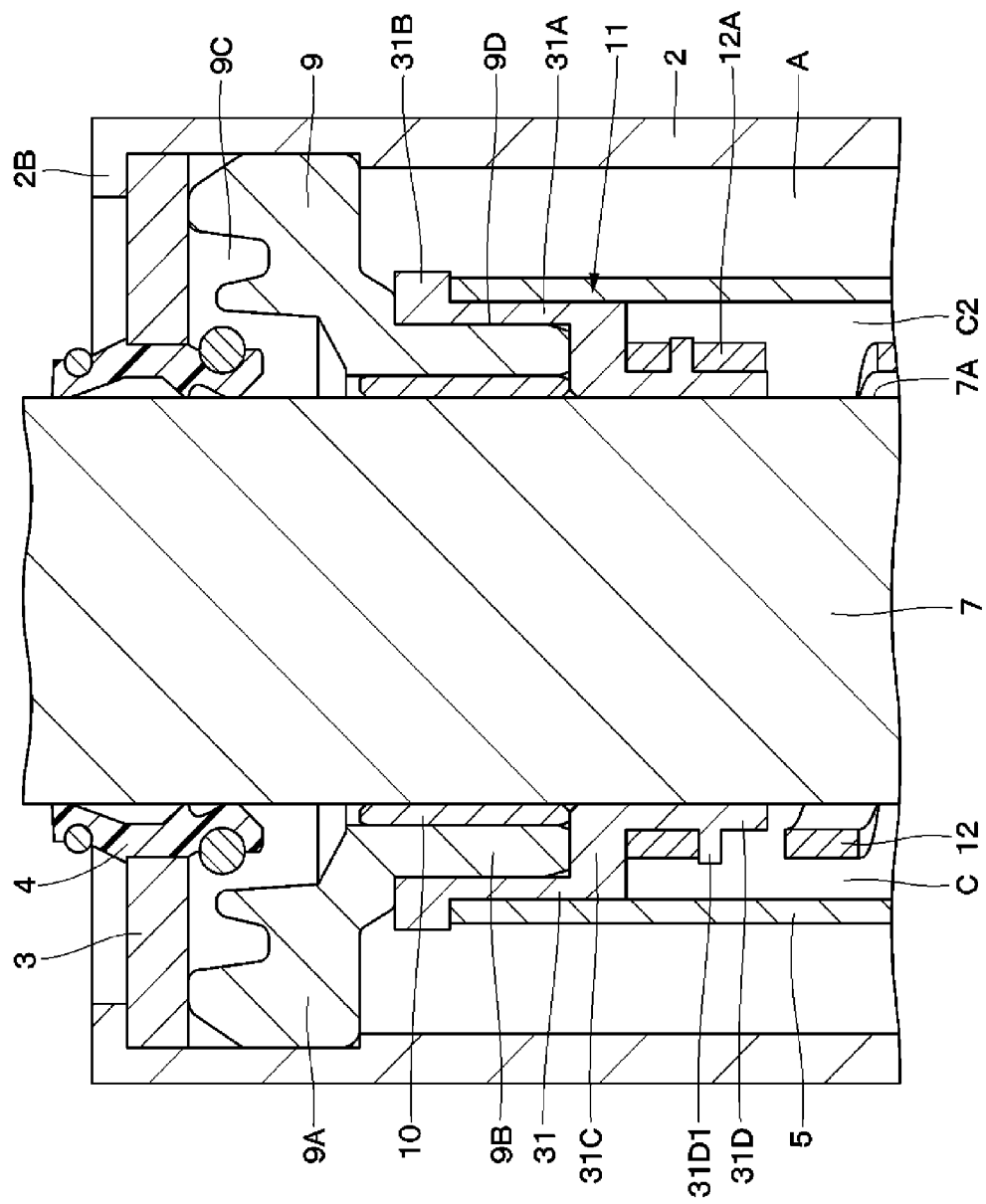
FIG. 10 is a cross-sectional view of a rebound control mechanism provided with a spring receiver according to a second embodiment of the present disclosure, together with a rod guide, as viewed from the same position as in FIG. 2.

Next, FIG. 10 represents a second embodiment of the present disclosure. A feature of the second embodiment is that the spring receiver includes a spring mounting portion provided to protrude from the second flange portion toward the piston. Further, the spring member is fitted to the outer periphery of the spring mounting portion. In the second embodiment, the same components as those in the first embodiment described above are designated by the same reference numerals, and the descriptions thereof will be omitted.

In FIG. 10, the spring receiver 31 used in the second embodiment includes a tubular portion 31A sandwiched between the inner cylinder 5 and the rod guide 9, a first flange portion 31B provided at the upper end of the tubular portion 31A, extending outward in the radial direction, and positioned axially by the upper end of the inner cylinder 5, a second flange portion 31C provided at the lower end of the tubular portion 31A and extending inward in the radial direction, and a spring mounting portion 31D provided to protrude from the inner diameter of the second flange portion 31C toward the piston 6. The spring mounting portion 31D is press-fitted to the upper portion 12A of the spring member 12. In other words, the upper portion 12A of the spring member 12 is fitted to the outer periphery of the spring mounting portion 31D. Further, the spring receiver 31 according to the second embodiment is integrally formed as a stepped cylindrical body including a tubular portion 31A, a first flange portion 31B, a second flange portion 31C, and a spring mounting portion 31D.

The upper portion 12A of the spring member 12 is fitted to the spring mounting portion 31D in a tightly fitted state on the outer periphery thereof. Further, on the outer periphery of the spring mounting portion 31D, a fixing portion 31D1 is provided to protrude outward in the radial direction, as in the case of the spring mounting portion 13E according to the first embodiment. As a result, the spring receiver 31 may directly fix the upper portion 12A of the spring member 12 by the second flange portion 31C.

Thus, even in the second embodiment, almost the same operation and effect as in the first embodiment may be obtained. In particular, in the present embodiment, since the spring receiver 31 is formed as a one-stepped cylinder, the number of parts may be reduced and the assembly workability may be improved.

Figure 11:
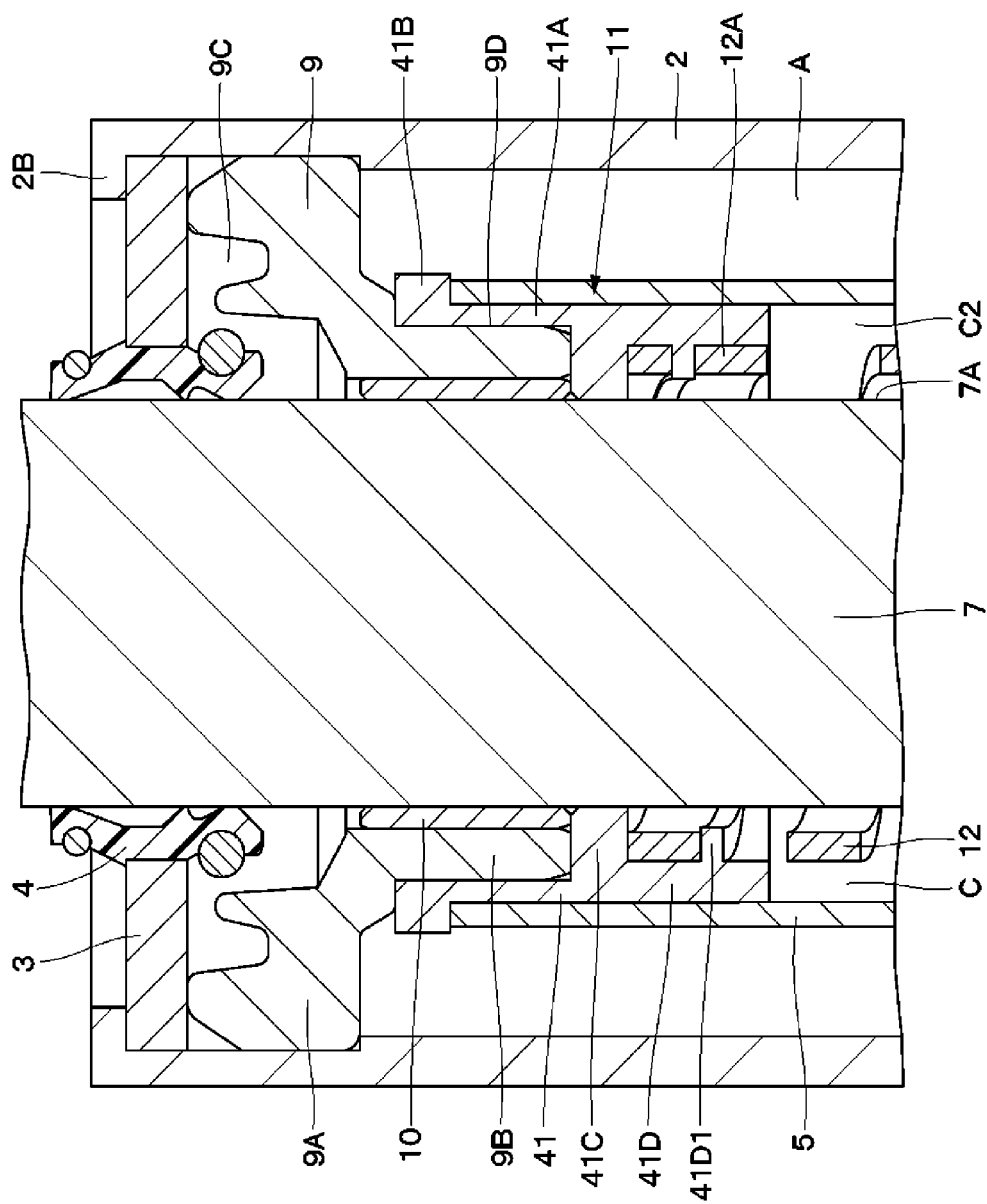
FIG. 11 is a cross-sectional view of a rebound control mechanism provided with a spring receiver according to a third embodiment of the present disclosure, together with a rod guide, as viewed from the same position as in FIG. 2.

Next, FIG. 11 represents a third embodiment of the present disclosure. A feature of the third embodiment is that the spring receiver includes a spring mounting portion provided to protrude from the second flange portion toward the piston. Further, the spring member is fitted to the inner periphery of the spring mounting portion. In the third embodiment, the same components as those in the first embodiment described above are designated by the same reference numerals, and the descriptions thereof will be omitted.

In FIG. 11, the spring receiver 41 used in the third embodiment includes a tubular portion 41A sandwiched between the inner cylinder 5 and the rod guide 9, a first flange portion 41B provided at the upper end of the tubular portion 41A, extending outward in the radial direction, and positioned axially by the upper end of the inner cylinder 5, a second flange portion 41C provided at the lower end of the tubular portion 41A and extending inward in the radial direction, and a spring mounting portion 41D provided to protrude from the outer diameter of the second flange portion 41C toward the piston 6. The upper portion 12A of the spring member 12 is press-fitted to the inner periphery of the spring mounting portion 41D. Further, the spring receiver 41 according to the third embodiment is integrally formed as a stepped cylindrical body including a tubular portion 41A, a first flange portion 41B, a second flange portion 41C, and a spring mounting portion 41D.

The upper portion 12A of the spring member 12 is fitted to the spring mounting portion 41D on the inner periphery hereof in a press-fitted state. Further, on the inner periphery of the spring mounting portion 41D, a fixing portion 41D1 is provided to protrude inward in the radial direction. As a result, the spring receiver 41 may directly fix the upper portion 12A of the spring member 12 by the second flange portion 41C.

Thus, even in the third embodiment, almost the same operation and effect as in the first embodiment may be obtained. In particular, in the present embodiment, since the spring receiver 41 is formed as a one-stepped cylinder, the number of parts may be reduced and the assembly workability may be improved.

In each embodiment, a case where a bush 19 including a slide bearing is applied as a sliding member is illustrated. However, the present disclosure is not limited thereto, and for example, an O-ring may be used as the sliding member. Further, a bush using multiple steel balls may be used.

Further, in each embodiment, the tubular portion of the spring receiver is sandwiched between the cylinder and the closing member, and a first flange portion extending outward in the radial direction and positioned axially by one end of the cylinder is provided on one end of the tubular portion. However, the first flange portion may be omitted and fixed to either the cylinder or the closing member.

Further, in the first embodiment, the case where the communication passage 19A is provided in the bush 19 of the other cylinder 15 between the piston rod 7 and the other cylinder 15 is illustrated. However, the present disclosure is not limited thereto, and a communication passage may be provided on the outer periphery of the bush and the bush insertion portion of another cylinder. That is, the communication passage is not limited to such a configuration as long as the hydraulic oil may flow between the upper position and the lower position of the bush (sliding contact member). This configuration is similarly applicable to other embodiments.

Further, in each embodiment, a double-cylinder type shock absorber including the outer cylinder 2 and the inner cylinder 5 has been described as an example. However, the present disclosure is not limited thereto, and may be applied to a single cylinder type shock absorber provided by slidably inserting a piston into a single cylinder.

Further, in each embodiment, the hydraulic shock absorber 1 attached to each wheel of the four-wheeled vehicle has been described as a representative example of the cylinder device. However, the present disclosure is not limited thereto, and may be, for example, a hydraulic shock absorber used for a two-wheeled vehicle, or may be used for a cylinder device used for various machines and buildings other than a vehicle.

As the cylinder device based on the embodiments described above, for example, the one described below may be considered.

A first aspect of the cylinder device includes: a cylinder in which a working fluid is filled and sealed; a piston slidably fitted into the cylinder to divide the inside of the cylinder into a rod side chamber and a bottom side chamber; a piston rod connected to the piston; a closing member provided at one end of the cylinder through which the piston rod is inserted and closed; and a rebound control mechanism that operates during an extension stroke of the piston rod when the piston moves toward the closing member in the cylinder. The rebound control mechanism includes: a spring member located between the piston and the closing member and provided on an outer periphery of the piston rod; and a spring receiver provided on the closing member and to which one end of the spring member is attached. The spring receiver includes a tubular portion fixed between the cylinder and the closing member, and a second flange portion provided at another end of the tubular portion and extending inward in a radial direction, and is configured to directly or indirectly fix the one end of the spring member by the second flange portion.

According to a second aspect of the cylinder device, in the first aspect, a first flange portion extending outward in the radial direction and positioned axially by one end of the cylinder is formed at one end of the tubular portion.

According to a third aspect of the cylinder device, in the first or second aspect, the spring receiver includes a third flange portion engaged with the second flange portion, and a spring mounting portion protruding from the third flange portion toward the piston and press-fitted into one end of the spring member.

According to a fourth aspect of the cylinder device, in the first or second aspect, the spring receiver includes a spring mounting portion protruding from the second flange portion toward the piston.

According to a fifth aspect of the cylinder device, in the fourth aspect, the spring member is fitted to an outer periphery of the spring mounting portion.

According to a sixth aspect of the cylinder device, in the fourth aspect, the spring member is fitted to an inner periphery of the spring mounting portion.

According to a seventh aspect of the cylinder device, in the third to sixth aspects, a fixing portion protrude from the spring mounting portion and is fixed to a gap between wires forming the spring member.

According to an eighth aspect of the cylinder device, in the first to seventh aspects, the closing member is press-fitted to an inner periphery of the tubular portion of the spring receiver.

DESCRIPTION OF SYMBOLS

1: hydraulic shock absorber (cylinder device)
5: inner cylinder (cylinder)
6: piston
7: piston rod
9: rod guide (closing member)
11: rebound control mechanism
12: spring member
12A: upper portion (one end)
13, 31, 41: spring receiver
13A, 31A, 41A: tubular portion
13B, 31B, 41B: first flange portion
13C, 31C, 41C: second flange portion
13D: third flange portion
13E, 31D, 41D: spring mounting portion
13E1, 31D1, 41D1: fixing portion
B: bottom side chamber
C: rod side chamber

What is claimed is:

1. A cylinder device comprising:
a cylinder in which a working fluid is filled and sealed;
a piston slidably fitted into the cylinder to divide an inside of the cylinder into a rod side chamber and a bottom side chamber;
a piston rod connected to the piston;
a rod guide provided at one end of the cylinder through which the piston rod is inserted and closed; and
a rebound control mechanism that operates during an extension stroke of the piston rod when the piston moves toward the rod guide in the cylinder,
wherein the rebound control mechanism includes:
a spring located between the piston and the rod guide and provided on an outer periphery of the piston rod; and
a spring receiver provided on the rod guide and to which one end of the spring is attached, and
wherein the spring receiver includes a tubular portion fixed between the cylinder and the rod guide, and a second flange portion provided at one end of the tubular portion and extending inward in a radial direction, and is configured to directly or indirectly fix the one end of the spring by the second flange portion, and
wherein the spring receiver includes a third flange portion engaged with the second flange portion, and a spring mounting portion protruding from the third flange portion toward the piston and press-fitted into one end of the spring.

2. The cylinder device according to claim 1, wherein a first flange portion is formed at a remaining end of the tubular portion to extend outward in the radial direction and be axially positioned by the one end of the cylinder.

3. The cylinder device according to claim 1, wherein the spring receiver includes a spring mounting portion protruding from the second flange portion toward the piston.

4. The cylinder device according to claim 3, wherein the spring is fitted to an inner periphery of the spring mounting portion.

5. The cylinder device according to claim 1, wherein a fixing portion protrudes from the spring mounting portion and is fixed to a gap between wires forming the spring.

6. The cylinder device according to claim 1, wherein the rod guide is press-fitted to an inner periphery of the tubular portion of the spring receiver.

7. A cylinder device, comprising:
a cylinder in which a working fluid is filled and sealed;
a piston slidably fitted into the cylinder to divide an inside of the cylinder into a rod side chamber and a bottom side chamber;
a piston rod connected to the piston;
a rod guide provided at one end of the cylinder through which the piston rod is inserted and closed; and
a rebound control mechanism that operates when the piston moves toward the rod guide in the cylinder during an extension stroke of the piston rod,
wherein the rebound control mechanism includes;
a spring located between the piston and the rod guide and provided on an outer periphery of the piston rod; and
a spring receiver provided on the rod guide and to which one end of the spring is attached, and
wherein the spring receiver includes a tubular portion fixed between the cylinder and the rod guide, and a second flange portion provided at one end of the tubular portion and extending inward in a radial direction, and is configured to directly or indirectly fix the one end of the spring by the second flange portion, wherein the spring receiver includes a spring mounting portion protruding from the second flange portion toward the piston, and wherein the spring is fitted to an outer periphery of the spring mounting portion.

* * * * *